May 17, 1966  E. PADDISON  3,252,053
ELECTRICAL PROTECTIVE RELAYS
Filed Sept. 15, 1961  2 Sheets-Sheet 1
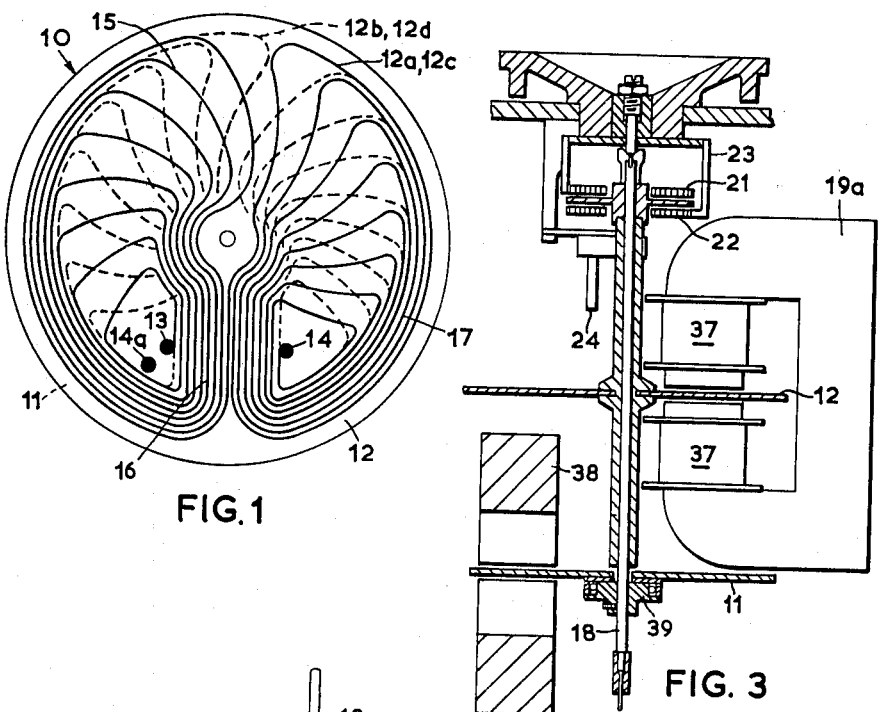
FIG. 1
FIG. 3
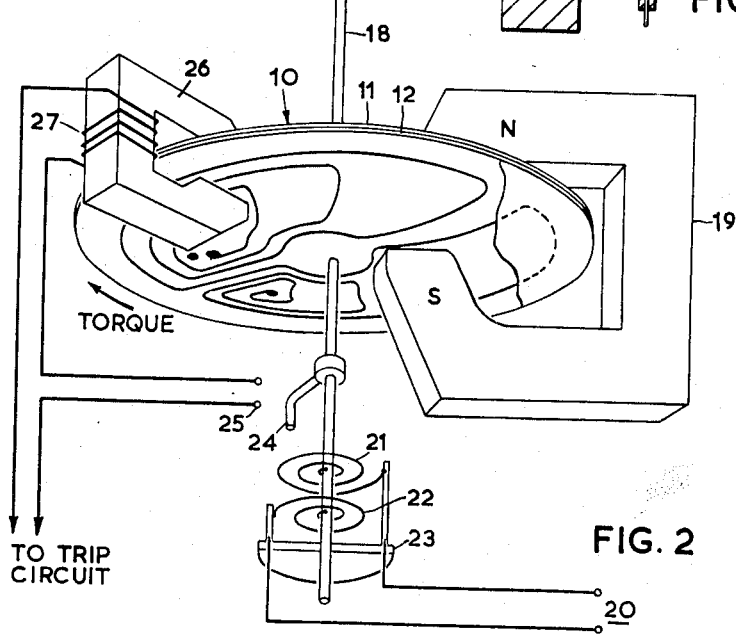
FIG. 2
Inventor
Eric Paddison
By Stevens, Davis, Miller &
Mosher
Attorneys May 17, 1966 E. PADDISON 3,252,053
ELECTRICAL PROTECTIVE RELAYS
Filed Sept. 15, 1961 2 Sheets-Sheet 2

Inventor:
Eric Paddison
By Stevens, Davis, Miller & Mosher
Attorneys

United States Patent Office 3,252,053
Patented May 17, 1966

3,252,053
ELECTRICAL PROTECTIVE RELAYS
Eric Paddison, Stafford, England, assignor to The English Electric Company Limited, London, England, a British company
Filed Sept. 15, 1961, Ser. No. 138,423
Claims priority, application Great Britain, Oct. 11, 1960, 34,743/60
8 Claims. (Cl. 317—58)

This invention relates to armatures or rotors in or for motor-pattern electrical portective relays, that is to say relays dependent upon the rotation of a motor armature (or rotor) and designed to bring about automatic de-energization and/or disconnection of electrical plant from the source of supply, under predetermined conditions, usually abnormal and likely to cause damage to the affected plant. Relays, as hereinbefore defined in accordance with British Standard No. 142; 1953, will hereinafter be referred to as "relays of the kind specified."

According to the present invention a motor-pattern electrical protective relay comprises a stationary magnet having two opposed magnetic poles defining between them an air gap, a disc-shaped rotor, means for mounting the rotor for rotation about its central transverse axis and with a part of the rotor extending through the air gap, restoring spring means for biasing the rotor to a non-operative position, electrical detecting means for detecting when, on rotation of the rotor from the non-operative position, the rotor reaches an operative position, and an electrical winding carried by the rotor for causing the rotor to rotate from the non-operative position to the operative position when the winding is energized by a relay operating current of at least a predetermined minimum magnitude, the winding including a plurality of substantially radial torque-producing current paths spaced angularly around the rotor, and a plurality of return current paths connecting the torque-producing current paths in series so as to form two series-connected multi-turn flat spiral coils disposed on opposite sides of, and normal to, the transverse axis of the rotor, and progressing in opposite senses relative to one another so that all of the torque-producing current paths carry current in the same sense, the return current paths including substantially radial portions which are grouped together in a single part of the rotor which does not pass through the air gap as the rotor moves between the operative and non-operative positions, and circumferential portions grouped so as likewise not to pass through the air gap on movement of the rotor between the said two positions.

The rotor may carry, if desired, in addition to the said electrical winding at least one other electrical winding similar to the first-mentioned electrical winding, the electrical windings being connected electrically in series with one another for energisation by the relay operating current and so as to assist one another, and the electrical windings having their respective sets of torque-producing current paths staggered angularly with respect to one another so as to reduce the effective pitch between successive torque-producing current paths.

According to another feature of the present invention the angular pitch between successive torque-producing current paths is progressively reduced around the rotor in a sense such as to cause the driving torque exerted on the rotor as it moves from the non-operative position towards the operative position under the influence of the relay operating current to increase in a manner compensating, at least in part, for variation in the restoring torque exerted on the rotor by the restoring spring means.

According to another feature of the present invention each torque-producing current path is skewed from a radial direction over at least a part of its length in a manner such as to reduce cyclic variation of the driving torque exerted on the rotor as successive torque-produced current paths pass into the said air gap.

Where two electrical windings are carried by the rotor, as aforesaid, each torque-producing current path is skewed from a radial direction over at least a part of its length in a manner such as to reduce cyclic variation of the driving torque exerted on the rotor as successive torque-producing current paths pass into the said air gap, the torque-producing current paths of one of the electrical windings being skewed in a sense opposite to that in which the torque-producing current paths of the other electrical winding are skewed so as to at least reduce the resultant magnitude of any radial forces exerted on the rotor due to the skewing of the torque-producing current paths from radial directions.

According to another feature of the present invention the rotor also includes a circular electrically conducting member mounted closely adjacent but electrically insulated from the electrical winding, so as to have a part of the electrically conducting member extending through the said air gap, and there is provided temperature responsive adjusting means for adjusting the position of the magnet radially relative to the transverse axis of the rotor so that a damping torque exerted on the rotor by dint of eddy current induction in the electrically conducting circular member on movement of the member in the air gap is adjusted automatically to compensate for temperature-induced variations in the resistance of the electrically-conducting member, the lengths of the torque-producing current paths of the electrical winding being of sufficient length in radial directions that adjustment of the radial position of the magnet causes no substantial variation in the driving torque exerted on the rotor when the electrical winding is energised by the relay operating current.

A relay according to the invention will now be described, by way of example, with reference to the accompanying drawings in which:

FIG. 1 is an inverted plan view of a rotor for the relay,

FIG. 2 is a perspective view of a D.C. operated time-overcurrent relay containing a rotor as shown in FIG. 1, FIG. 3 is a sectional elevation on the axis of a modified form of relay.

Figure 4:
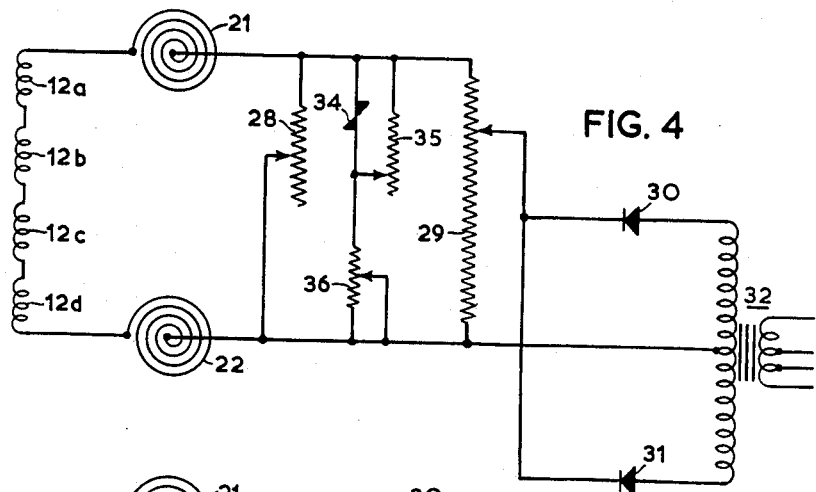
FIG. 4 shows a circuit suitable for a relay having two flexible spiral connections.

Referring to FIG. 1, the rotor 10 comprises an aluminium disc 11 and, bonded thereto, a disc 12 of insulating material containing windings 12a, 12b, 12c and 12d. The disc 12 consists of axially adjacent thin layers of insulating material each of which has one of said windings printed thereon, a further thin layer of insulating material being provided to cover the bottom one of these printed windings and all these layers being bonded together so as to provide a unitary structure. For the sake of clarity, FIG. 1 shows the rotor with the said covering layer removed, thereby exposing the winding 12a to view. The windings 12a–d are connected in series by means of cores of conducting material such as 13 extending through perforations in the layers of insulating material and the ends of the series-windings are brought out, again through suitable perforations in the insulating layers, on the underside of the rotor at 14 and 14a respectively for connection to an external circuit, as hereinafter described with reference to FIG. 2.

Each winding 12a–d comprises two oppositely wound series-connected coils; each of these coils consists of a plurality of turns, each of said turns having a torque producing path, such as 15, the return connection between successive torque producing paths having portions such as 16 arranged substantially radially of the rotor 10 and circumferential portions such as 17. The portions 16 are arranged on a region of the rotor which is not carried between the poles of the relay operating magnet as the rotor rotates from its non-operative to its operative position. The effective pitch between successive torque producing paths 15 is successively reduced so as to counteract the increase of restoring torque produced by the restoring springs of the relay.

It will also be noted that the torque producing paths 15 are not truly radial; they are skewed so as to reduce the notching effect on the driving torque produced by the passage of these discrete producing paths 15 between the poles of the relay operating magnet during operation of the latter; the torque producing paths 15 of the windings 12, 12b and 12d are skewed in the opposite direction to those of the windings 12a and 12c in order to cancel out the radial components of force created by the skewing. The torque producing paths 15 are, in fact, curved, i.e., progressively skewed in a radially outward direction of the rotor. As mentioned previously, skewing of the torque producing paths 15 for the purpose of reducing the notching effect, can be dispensed with if the contour of the pole faces of the relay operating magnet is curved, i.e., for example if these pole faces are elliptical in shape so that the effective length of each torque producing path 15, as it passes between said pole faces, gradually increases to a maximum and then gradually reduces to zero.

Dividing up each winding 12a–d into two coils whereby the circumferential portions 17 of the return connections are arranged in two relatively angularly spaced groups has the effect of reducing the overall radial length of the portions 16, so that for a given operating length of the shortest torque producing path 15 a reduction in rotor diameter, and thereby a reduction in inertia is achieved.

Referring now to FIG. 2, the relay is shown to comprise a rotor 10 as hereinbefore described, pivotally mounted by a spindle 18, so that it moves between the poles of a permanent relay operating magnet 19. The rotor windings 12a–d are energized by a D.C. operating current supplied to the relay terminals 20, and fed to said windings through flexible connections formed by spiral restoring springs 21, 22, acting between a relay frame structure (not shown) and two mutually insualted portions of the spindle 18 whereby electrical connection is made to the rotor windings. A spring suppression adjuster 23, common to both restoring springs 21, 22 is provided for adjusting the spring suppression or initial restoring torque of these springs simultaneously. In the absence of an operating current in the rotor windings, the springs bias the rotor to a non-operative position in which the moving contact 24 of the relay is arrested by a stop (not shown) attached to the relay frame structure. When sufficient current flows in the rotor windings to produce an electro-magnetic force adequate to overcome the bias of the springs, the rotor is displaced to the operative position in which the moving contact 24 bridges fixed contacts 25 to close a trip circuit. The time delay between the occurrence of the relay operating current and closure of the trip circuit is dictated by the time taken for the disc to rotate from the non-operative to operative position. The moving contact 24 and the fixed contacts 25 form the detector which provides the relay output indication.

In addition to providing the relay operating torque in conjunction with the rotor windings 12a–d, the permanent magnet 19 also produces a damping torque on the rotor 10 by inducing eddy currents in the aluminium disc 11. This ensures that the excess of operating torque over the spring restraining torque produces a rotor speed which determines the relay operating time and renders it dependent upon the overcurrent.

If the relay is required to re-set quickly after operation, it is necessary that the damping torque should be effective in the relay operating direction only and ineffective in the re-setting direction. In such a case a small axial clearance is provided between the aluminium disc 11 and the disc of insulating material 12, with both discs however still operating in the same magnet gap; the aluminium disc 11 is then built onto an enlarged hub containing a ball and ramp-type free wheel, as will be hereinafter described in greater detail with reference to FIG. 3.

A D.C. electro-magnet 26 is provided to co-act with the portions 16 of the return connections when the rotor 10 is in the operative position, the coil 27 of the electromagnet 26 being connected in series with the trip coil so that, when the moving contact 24 closes the fixed contacts 25, and thus makes the trip circuit, the electromagnet 26 will be energized and in conjunction with the current flowing in the said portion 16 of the windings 12a–d, will provide an increase in torque in the relay operating direction and thus an increased contact pressure between the contacts 24 and 25. A separate auxiliary D.C. seal-in relay can thus be dispensed with and increased current ratings for the contacts 24, 25 tolerated.

If temperature compensation is required, it may be provided by making the radial distance of the permanent magnet 19 from the spindle 18 temperature responsive, as for example by means of a mounting comprising a bimetallic element; if such radial adjustment is within the length of the shortest torque producing path 15 its effect on the relay operating torque will be negligible since the torque is a function of the effective radius and of the number of torque producing paths 15 between the poles of the magnet 19, and the latter is decreased as the former is increased. The damping torque, on the other hand, is affected by this effective radius and this adjustment can therefore be made to have a large effect on the amount of damping, and thus on the operating time of the relay, by causing a departure from the optimum effective radius for maximum damping.

It will be appreciated that the relay shown in FIG. 2 has an operating time which is substantially inversely proportional to the relay operating current, since the flux produced by the permanent magnet 19 is constant.

Referring now to FIG. 3, the relay shown therein has an electro-magnet 19a, as the relay operating magnet in place of the permanent magnet 19 shown in FIG. 2, its coils 37 being connected in series with the rotor windings 12a–d (FIG. 1). Since the flux is now also substantially proportional to the relay operating current, this relay has an operating time which is approximately inversely proportional to the square of the relay operating current.

In this construction the insulated disc 12 and the aluminium damping disc 11 are spaced axially apart and a separate permanent magnet 38 is provided to co-act with the aluminium damping disc 11 for providing a damping torque which is again independent of the relay operating current.

The damping disc 11 is connected to the spindle 18 through a ball and ramp-type freewheel clutch 39 so that, upon cessation of the relay operating current, the insulated disc 12 and the moving contact 24 on the spindle 18 can revert to the non-operative position without being retarded by the damping torque produced by the damping disc 11 in conjunction with the damping magnet 38.

For sake of clarity, the electro-magnet 26 (see FIG. 2) has been omitted from FIG. 3 but can, of course, be provided if desired.

It will be noted that, in the construction shown in FIG. 3, the spring assembly 21, 22, 23 and the moving contact 24 are conveniently arranged above the insulated disc 12, the moving contact 24 pointing downwards.

Referring now to FIG. 4, the circuit shows the rotor windings 12a–d in series and connected through the spiral restoring springs 21, 22 to an external circuit comprising an adjustable shunt resistor 28 for calibration purposes, a reverse connected potentiometer 29 and two rectifiers 30, 31 connected in a push-pull circuit with the centre-tapped secondary winding of a current transformer 32. In this arrangement the fine current setting is adjusted on the potentiometer 29 and the coarse current setting is adjusted by means of taps on the primary winding of the current transformer 32. The primary winding of the current transformer 32 is connected in the circuit to be protected by the relay; a full-wave rectified signal dependent on the current in the protected circuit is thus applied to the windings 12a–d.

Where it is desired to provide a relay characteristic in accordance with that specified in British Standard No. 142, the rotor windings are shunted by a circuit comprising a non-linear resistor 34 shunted by and in series with variable resistors 35 and 36 respectively. This non-linear shunt circuit 34, 35, 36 may be provided either on the D.C. or the A.C. side of the rectifiers, but the current setting adjusting means (in this case the potentiometer 29) must be on the input side of the said of the said non-linear shunt circuit, in order to obtain characteristics of similar shape on all current settings.

Alternatively, a characteristic according to British Standard No. 142 can be obtained by saturating the iron circuit of the current transformer 32.

Figure 5:
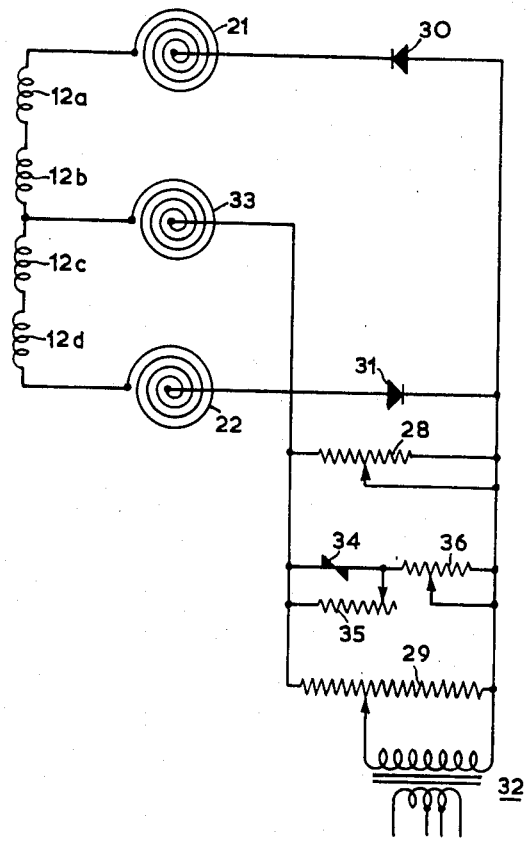
FIG. 5 shows a circuit similar to that of FIG. 4, but suitable for a relay having three flexible spiral connections.

Referring now to FIG. 5, a similar arrangement to that of FIG. 4 is shown, but a current transformer 32 without a centre tap on its secondary winding is used and an additional spiral restoring spring 33 is connected to the junction between the series-connected rotor windings 12a, 12b on the one hand and 12c, 12d on the other hand. It will also be noted that the current setting potentiometer 29 is on the A.C. side of the rectifiers 30, 31.

Calibration of the relay may be carried out in the following manner:

The spiral restoring springs 21, 22 (and 33 if fitted) are pre-set to a given suppression, for example, one full turn, the angle of suppression being matched to the rate of reduction in angular pitch of the torque producing paths 15 on the rotor. Provided the suppression is accurately set and the pitch of the said paths 15 is correct, the current required to balance the spring force at the starting position of the rotor will be equal to the current required to balance the spring force at the contact closing or operative position of the rotor, and similarly at any intermediate position irrespective of variation in spring rate or torque on the rotor. For matching purposes it may be necessary finally to use a different amount of suppression, in which case the pitch of the torque producing paths 15 will need to be re-calibrated.

The pick-up current is then set to the correct value by means of the adjustable shunt 28; alternatively a small current transformer may be provided and the pickup current adjusted by means of suitable taps thereon.

The use of the variable shunt 28 tends to cause the temperature errors to increase as the shunt resistance is reduced; however, by reason of the reverse connected potentiometer 29, as the shunt resistance is reduced the surplus resistance is inserted in series with the rotor windings 12a–d, whereby the temperature errors are minimised. Both the shunt 28 and the windings 12a–d are preferably made of copper and therefore have the same temperature co-efficient of resistance.

The radial distance of the permanent magnet 19 or 38 from the spindle 18 is then adjusted so as to give the correct operating time at the chosen value of calibrating current. As mentioned previously, this adjustment, which is within the length of the shortest torque producing path 15 will have very little effect on the driving torque in the construction according to FIG. 2 for, although the torque is proportional to the effective radius of application of the field of the permanent magnet 19, the number of torque producing paths 15 under the said magnet is inversely proportional to the radius.

The temperature compensation introduced by making the radius of the permanent magnet temperature responsive applies only to damping errors caused by a change of resistance of the aluminium damping disc 11. Temperature errors in the driving torque do not occur provided that the rotor windings 12a–d are energized from a current source.

It will be appreciated that any number of windings such as 12a, may be bonded together in axial juxtaposition and connected in series or parallel for the purpose of providing any desired number of turns. As an alternative to the construction shown in FIG. 3, the damping disc 11 and the insulated disc 12 may be arranged in the same plane and mutually spaced radially instead of axially; i.e. the insulated disc 12 could be at the centre of the rotor, surrounded by an annular aluminium disc, the two discs being acted upon by their respective magnets.

If, in the arrangement shown in FIG. 2, the permanent magnet 19 is replaced by an electro-magnet whose coils are connected in series with the rotor windings, a definite time relay is obtained which is suitable for use both on A.C. and D.C. The operating torque and damping torque both being proportional to the square of the current, the time of operation of such a device would be constant except for the small effect of the restoring springs.

It will be appreciated also that, depending on the external circuit to which the relay is connected, the rotor current and, where an electro-magnet is provided for producing the flux for the relay operating torque, the current in the coils of the electro-magnet may be proportional either to the current or the voltage of the circuit protected by the relay. Thus the present invention is applicable not only to over-current relays but also to under- or over-voltage relays; moreover, a directional relay may be provided of, for example, the construction shown in FIG. 3 wherein the rotor windings are energized by a current proportional to the current in the protected circuit and the coils of the electro-magnet are energized by the voltage of the protected circuit. In such a directional relay, however, the damping disc 11 and permanent magnet 38 may be omitted.

What I claim as my invention and desire to secure by Letters Patent is:

1. A motor-pattern electrical protective relay comprising a stationary magnet having two opposed magnetic poles defining between them an air gap, a disc-shaped rotor, means for mounting the rotor for rotation about its central transverse axis and with a part of the rotor extending through the air gap, restoring spring means for biasing the rotor to a non-operative position, electrical detecting means for detecting when, on rotation of the rotor from the non-operative position, the rotor reaches an operative position and an electrical winding carried by the rotor for causing the rotor to rotate from the non-operative position to the operative position when the winding is energised by a relay operating current of at least a predetermined minimum magnitude, the winding including a plurality of substantially radial torque-producing current paths spaced angularly around the rotor, and a plurality of return current paths connecting the torque-producing current paths in series so as to form two series-connected multi-turn flat spiral coils disposed on opposite sides of, and normal to, the transverse axis of the rotor, and progressing in opposite senses relative to one another so that all of the torque-producing current paths carry current in the same sense, the return current paths including substantially radial portions which are grouped together in a single part of the rotor which does not pass through the air gap as the rotor moves between the operative and non-operative positions, and circumferential portions grouped so as likewise not to pass through the air gap on movement of the rotor between the said two positions.

2. A motor-pattern electrical protective relay comprising a stationary magnet having two opposed magnetic poles defining between them an air gap, a disc-shaped rotor, means for mounting the rotor for rotation about its central transverse axis and with a part of the rotor extending through the air gap, restoring spring means for biasing the rotor to a non-operative position, electrical detecting means for detecting when, on rotation of the rotor from the non-operative position, the rotor reaches an operative position, an electrical winding carried by the rotor for causing the rotor to rotate from the non-operative position to the operative position when the winding is energised by a relay operating current of at least a predetermined minimum magnitude, the winding including a plurality of substantially radial torque-producing current paths spaced angularly around the rotor, and a plurality of return current paths connecting the torque-producing current paths in series so as to form two series-connected multi-turn flat spiral coils disposed on opposite sides of, and normal to, the transverse axis of the rotor, and progressing in opposite senses relative to one another so that all of the torque-producing current paths carry current in the same sense, the return current paths including substantially radial portions which are grouped closely together in a single part of the rotor which does not pass though the air gap as the rotor moves between the operative and non-operative positions, and circumferential portions grouped so as likewise not to pass through the air gap on movement of the rotor between the said positions, and at least one other electrical winding, similar to the first electrical winding, carried by the rotor and being connected electrically in series with the first electrical winding for energisation by the relay operating current in a manner such that the electrical windings assist one another, and the electrical windings having their respective sets of torque-producing current paths staggered angularly with respect to one another so as to reduce the effective pitch between successive torque-producing current paths.

3. A motor-pattern electrical protective relay comprising a stationary magnet having two opposed magnetic poles defining between them an air gap, a disc-shaped rotor, means for mounting the rotor for rotation about its central transverse axis and with a part of the rotor extending through the air gap, restoring spring means for biasing the rotor to a non-operative position, electrical detecting means for detecting when, on rotation of the rotor from the non-operative position, the rotor reaches an operative position, and an electrical winding carried by the rotor for causing the rotor to rotate from the non-operative position to the operative position when the winding is energised by a relay operating current of at least a predetermined minimum magnitude, the winding including a plurality of substantially radial torque-producing current paths spaced angularly around the rotor, and a plurality of return current paths connecting the torque-producing current paths in series so as to form two series-connected multi-turn flat spiral coils disposed on opposite sides of, and normal to, the transverse axis of the rotor, and progressing in opposite senses relative to one another so that all of the torque-producing current paths carry current in the same sense, the return current paths including substantially radial portions which are grouped closely together in a single part of the rotor which does not pass through the air gap as the rotor moves between the operative and non-operative positions, and circumferential portions grouped so as likewise not to pass through the air gap on movement of the rotor between the said two positions, and the angular pitch between successive torque-producing current paths being progressively reduced around the rotor in a sense such as to cause the driving torque exerted on the rotor as it moves from the non-operative position towards the operative position under the influence of the relay operating current to increase in a manner compensating, at least in part, for variation in the restoring torque exerted on the rotor by the restoring spring means.

4. A motor-pattern electrical protective relay comprising a stationary magnet having two opposed magnetic poles defining between them an air gap, a disc-shaped rotor, means for mounting the rotor for rotation about its central transverse axis and with a part of the rotor extending through the air gap, restoring spring means for biasing the rotor to a non-operative position, electrical detecting means for detecting when, on rotation of the rotor from the non-operative position, the rotor reaches an operative position, and an electrical winding carried by the rotor for causing the rotor to rotate from the non-operative position to the operative position when the winding is energised by a relay operating current of at least a predetermined minimum magnitude, the winding including a plurality of substantially radial torque-producing current paths spaced angularly around the rotor, and a plurality of return current paths connecting the torque-producing current paths in series so as to form two series-connected multi-turn flat spiral coils disposed on opposite sides of, and normal to, the transverse axis of the rotor, and progressing in opposite senses relative to one another so that all of the torque-producing current paths carry current in the same sense, the return current paths including substantially radial portions which are grouped closely together in a single part of the rotor which does not pass through the air gap as the rotor moves between the operative and non-operative positions, and circumferential portions grouped so as likewise not to pass through the air gap on movement of the rotor between the said two positions, and each torque-producing current path being skewed from a radial direction over at least a part of its length in a manner such as to reduce cyclic variation of the driving torque exerted on the rotor as successive torque-produced current paths pass into the said air gap.

5. A motor-pattern electrical protective relay according to claim 2, wherein in each of the two electrical windings each torque-producing current path is skewed from a radial direction over at least a part of its length in a manner such as to reduce cyclic variation of the driving torque exerted on the rotor as successive torque-producing current paths pass into the said air gap, the torque-producing current paths of one of the electrical windings being skewed in a sense opposite to that in which the torque-producing current paths of the other electrical winding are skewed so as to at least reduce the resultant magnitude of any radial forces exerted on the rotor due to the skewing of the torque-producing current paths from radial directions.

6. A motor-pattern electrical protective relay comprising a stationary magnet having two opposed magnetic poles defining between them an air gap, a disc-shaped rotor, means for mounting the rotor for rotation about its central transverse axis and with a part of the rotor extending through the air gap, restoring spring means for biasing the rotor to a non-operative position, electrical detecting means for detecting when, on rotation of the rotor from the non-operative position, the rotor reaches an operative position, an electrical winding carried by the rotor for causing the rotor to rotate from the non-operative position to the operative position when the winding is energised by a relay operating current of at least a predetermined minimum magnitude, the winding including a plurality of substantially radial torque-producing current paths spaced angularly around the rotor, and a plurality of return current paths connecting the torque-producing current paths in series so as to form two series-connected multi-turn flat spiral coils disposed on opposite sides of, and normal to, the transverse axis of the rotor, and progressing in opposite senses relative to one another so that all of the torque-producing current paths carry current in the same sense, the return current paths including substantially radial portions which are grouped closely together in a single part of the rotor which does not pass through the air gap as the rotor moves between the operative and non-operative positions, and circumferential portions grouped so as likewise not to pass through the air gap on movement of the rotor between the said two positions, a circular electrically conducting member mounted on the rotor closely adjacent but electrically insulated from the electrical winding so that a part of the electrically conducting member extends through the said air gap, and temperature responsive adjusting means for adjusting the position of the magnet radially relative to the transverse axis of the rotor so that a damping torque exerted on the rotor by dint of eddy current induction in the electrically conducting circular member on movement of the member in the air gap is adjusted automatically to compensate for temperature-induced variations in the resistance of the electrically-conducting member, the lengths of the torque-producing current paths of the electrical winding being of sufficient length in radial directions that adjustment of the radial position of the magnet causes no substantial variation in the driving torque exerted on the rotor when the electrical winding is energised by the relay operating current.

7. A motor-pattern electrical protective relay comprising a stationary magnet having two opposed magnetic poles defining between them an air gap, a disc-shaped rotor, means for mounting the rotor for rotation about its central transverse axis and with a part of the rotor extending through the air gap, restoring spring means for biasing the rotor to a non-operative position, electrical detecting means for detecting when, on rotation of the rotor from the non-operative position, the rotor reaches an operative position, an electrical winding carried by the rotor for causing the rotor to rotate from the non-operative position to the operative position when the winding is energised by a relay perating current of at least a predetermined minimum magnitude, the winding including a plurality of substantially radial torque-producing current paths spaced angularly around the rotor, and a plurality of return current paths connecting the torque-producing current paths in series so as to form two series-connected multi-turn flat spiral coils disposed on opposite sides of, and normal to, the transverse axis of the rotor, and progressing in opposite senses relative to one another so that all of the torque-producing current paths carry current in the same sense, the return current paths including substantially radial portions which are grouped closely together in a single part of the rotor which does not pass through the air gap as the rotor moves between the operative and non-operative positions, and circumferential portions grouped so as likewise not to pass through the air gap on movement of the rotor between the said two positions, an electromagnet having poles defining a second air gap through which a part of the rotor extends, and means for electrically energising the electromagnet only when the rotor is in the operative position, the electro-magnet being positioned so that when the rotor is in the operative position a part of the rotor carrying the said radial parts of the return current paths of the electrical winding extends within the air gap of the electro-magnet so that, when the electrical winding is energised by the relay operating current, interaction of this current in the said radial parts of the return current paths with the electro-magnet exerts a torque on the rotor tending to hold the rotor in the operative position.

8. A motor-pattern electrical protective relay comprising a stationary magnet having two opposed magnetic poles defining between them an air gap, a disc-shaped rotor, means for mounting the rotor for rotation about its central transverse axis and with a part of the rotor extending through the air gap, restoring spring means for biasing the rotor to a non-operative position, electrical detecting means for detecting when, on rotation of the rotor from the non-operative position, the rotor reaches an operative position, and an electrical winding carried by the rotor for causing the rotor to rotate from the non-operative position to the perative psition when the winding is energised by a relay operating current of at least a predetermined minimum magnitude, the winding including a plurality of substantially radial torque-producing current paths spaced angularly around the rotor, and a plurality of return current paths connecting the torque-producing current paths in series so as to form two series-connected multi-turn flat spiral coils disposed on opposite sides of, and normal to, the transverse axis of the rotor, and progressing in opposite senses relative to one another so that all of the torque-producing current paths carry current in the same sense, the return current paths including substantially radial portions which are grouped closely together in a single part of the rotor which does not pass through the air gap as the rotor moves between the operative and non-operative positions, and circumferential portions grouped so as likewise not to pass through the air gap on movement of the rotor between the said two positions, and the magnet having poles which are substantially of elliptical cross-section so that as each torque-producing path moves into the air gap between the poles the length of such path lying within the air gap varies smoothly from zero value to a maximum and then decreases smoothly to zero value.

References Cited by the Examiner
UNITED STATES PATENTS

| | | | |
|---|---|---|---|
| 3,036,248 | 5/1962 | Nellist | 310—268 X |
| 3,056,923 | 10/1962 | Parker | 324—150 |
| 3,080,541 | 3/1963 | Parker | 336—200 |
| 3,144,574 | 8/1964 | Baudot | 310—268 |
| 3,156,857 | 11/1964 | Herr et al. | 310—36 X |

FOREIGN PATENTS 1,048,996    1/1959    Germany.

SAMUEL BERNSTEIN, *Primary Examiner.*

W. B. KIRCHER, D. YUSKO, *Assistant Examiners.*